June 14, 1927.
E. A. MALMGREN
PLANT SERVICE CAR
Filed Feb. 11, 1926
1,632,240
3 Sheets-Sheet 1
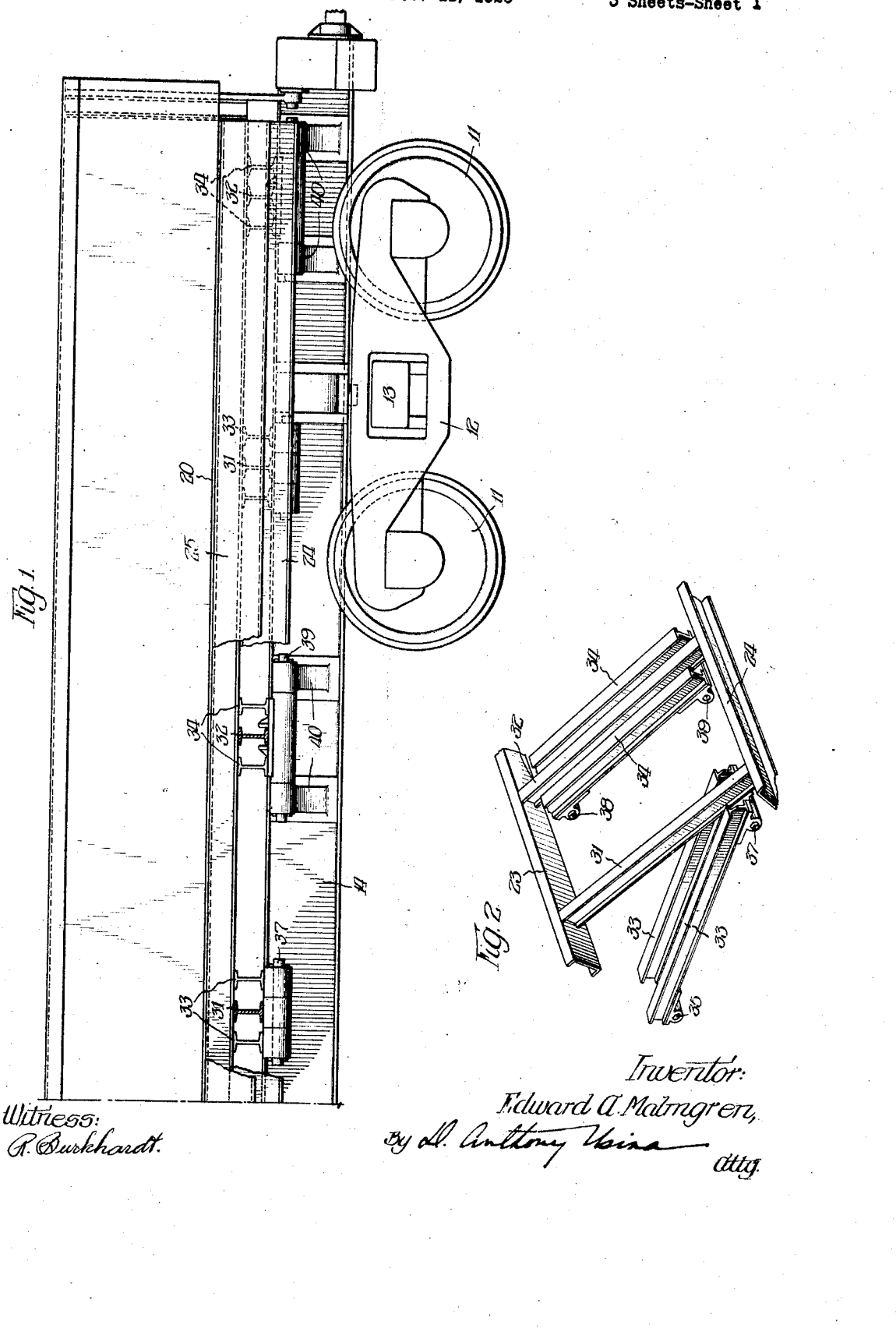

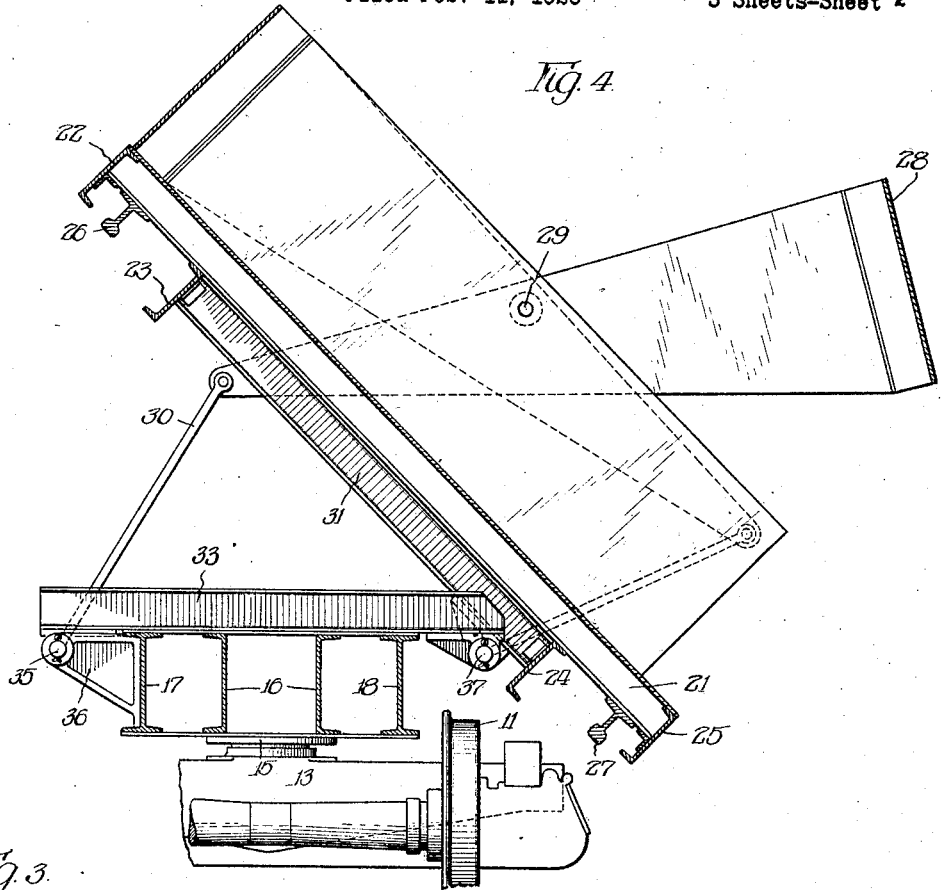
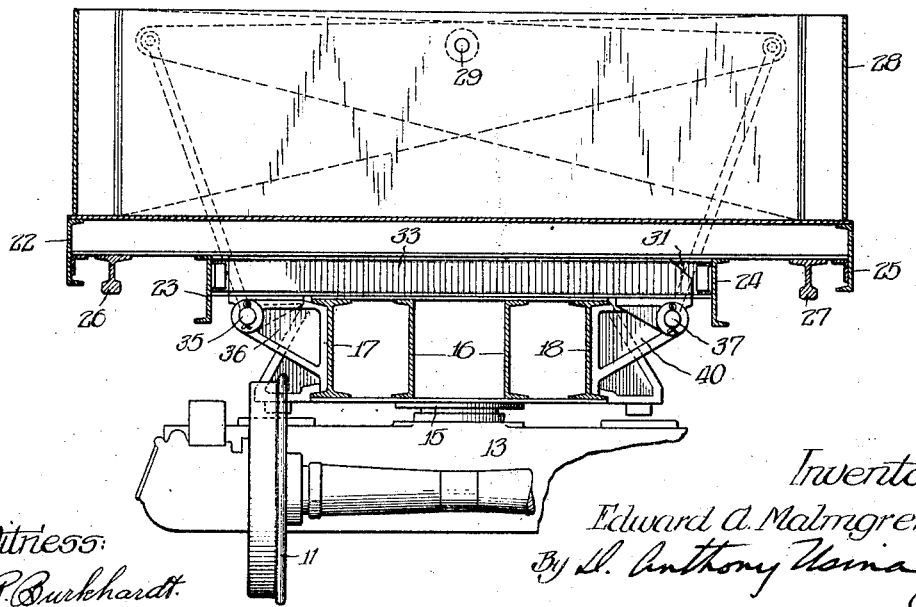

June 14, 1927.　　　　E. A. MALMGREN　　　1,632,240
PLANT SERVICE CAR
Filed Feb. 11, 1926　　　3 Sheets-Sheet 3
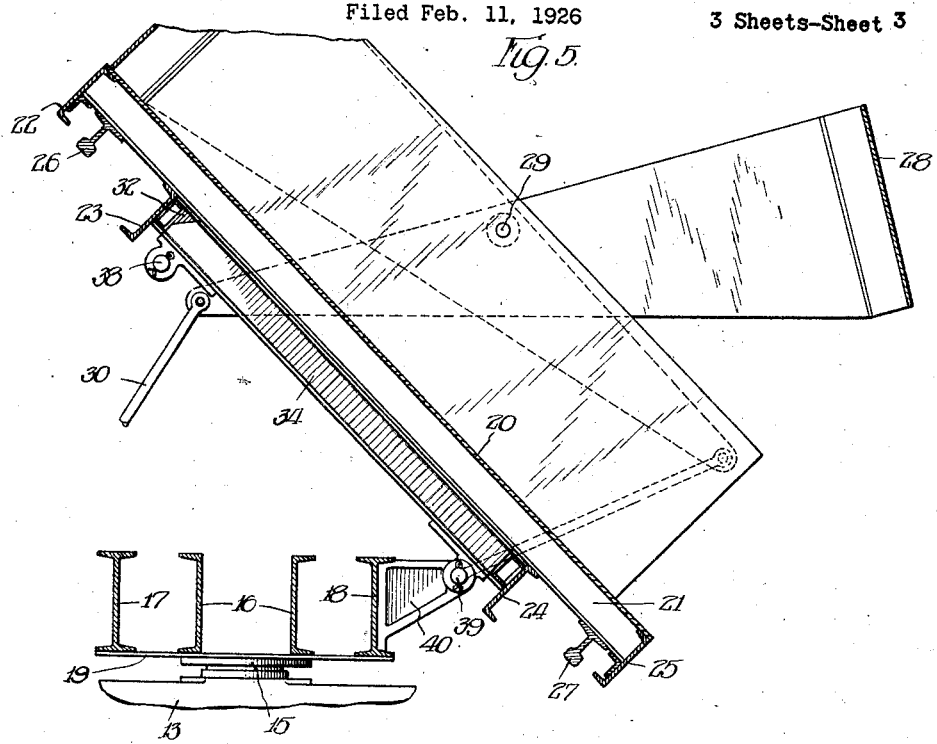

Patented June 14, 1927.

1,632,240

UNITED STATES PATENT OFFICE.

EDWARD A. MALMGREN, OF DULUTH, MINNESOTA.

PLANT SERVICE CAR.

Application filed February 11, 1926. Serial No. 87,581.

This invention relates to a new and improved plant service car and more particularly to a car of this character adapted to be dumped to either side.

Cars of this type have a wide variety of uses and are particularly adapted for handling the overburden and ore stripped out by steam shovels in open mining operations. This material is handled by very large steam shovels and is often present in large masses. Due to the size of the individual lumps or masses, it is impractical to dump the material between the rails where the available passage area is limited. Certain types of cars now in use are provided with pivots extending longitudinally of the car, which construction necessitates relatively high pivots in order that the dumping side may swing down sufficiently to give the floor an angle adequate for a quick, clean dump. This high pivot and consequent high center of gravity renders the cars difficult to handle and subject to accidental derailment and turnover. Also, the impact of the car body and load on the trucks and underframe when one side is dropped in dumping gives rise to stresses which cause high repair expenses.

It is an object of the present invention to provide a car adapted to dump to either side and constructed with a low center of gravity.

It is an additional object to provide a car of this type adapted to dump by tilting the floor without sudden shocks to the car construction.

It is a further object to provide a car which is composed of simple rugged members, the construction being adapted to minimize repair expense.

It is also an object to provide a car adapted to be dumped by the application of external force.

Other and further objects will appear as the description proceeds.

I have illustrated a preferred embodiment of my invention in the accompanying drawings, in which Figure 1 is a side elevation partly broken away to show the dumping mechanism;

Figure 2 is a fragmentary perspective view showing the mechanism connecting the car body and underframe;

Figure 3 is a partial transverse section of the car;

Figure 4 is a view similar to Figure 3, but showing the car dumped to one side;

Figure 5 is a view similar to Figure 4, but showing the reverse form of connecting construction, and Figure 6 is a fragmentary plan view, showing two opposite connecting constructions.

The car comprises the wheels 11, truck side frames 12 and bolsters 13. The center frame construction 14 is supported from the bolsters 13 by the usual type of pivot element 15. The center frame construction shown consists of a pair of oppositely faced channel sections 16 together with a pair of I-beams 17 and 18. These longitudinal members are tied together by the plate 19.

The car body comprises the floor 20 supported on cross frames 21 and longitudinal frame members 22, 23, 24 and 25. The rails 26 and 27 are secured to the under side of the cross frames 21 for use in dumping the car. The side doors 28 are pivotally connected to the car body at 29 and are swung away from the side of the car in the dumping operation by means of the connecting links 30. The longitudinal car frame members 23 and 24 are connected by the transverse members 31 and 32 as best shown in Figure 2. Each transverse member 31 lies between a pair of transverse members 33 and each transverse member 32 lies between a pair of transverse members 34. As best shown in Figures 2 and 4, the transverse members 33 are pivotally connected by the pins 35 to the brackets 36 secured to the I-beams 17. The transverse members 31 are pivotedly connected by the pins 37 to the ends of the transverse members 33 opposite to their connection to the pins 35.

Referring now particularly to Figures 2 and 5, the transverse members 32 are pivotedly connected to the transverse members 34 by the pins 38. The opposite ends of the transverse members 34 are hingedly connected by the pins 39 to the lugs 40 secured to the I-beams 18. It will be apparent, therefore, that the method of connecting the transverse beam assemblies 31 and 33 to each other and to the car body and car frame are identical with the method of connecting the similar transverse assemblies 32 and 34 with the exception that the assemblies are reversed in direction. It will be understood that there will be a plurality of these assemblies along the car as shown in Figure 1, the two types of assemblies alternating. The number of assemblies will depend upon the length of the car.

In the operation of the car a lifting force will be applied to either the rail 26 and 27 depending upon whether the car is to be dumped to the right or left. In the form of construction shown, this force will be applied by external dumping engines. This is entirely practical as the cars are intended to be dumped only at fixed points into crushers or sorting bins, or other handling installations. It will be understood, however, that the force may be applied by dumping cylinders carried by the car itself, this method of applying the force being old in the art.

When the car is dumped to the right as shown in Figures 4 and 5, all of the transverse members 31 and 32 being rigidly connected to the car body swing up with that body. As shown in Figure 4, the members 31 pivot about the pin 37 and the members 33 are held down against the I-beams 17 and 18 and channels 16. There is no movement about the pivot pin 35. The members 32 carry with them the members 34 to which they are connected by pin 38. The members 34 pivot about the pins 39 carried by lugs 40. It will be understood that in dumping to the left, the operation of the two types of transverse assemblies will be exactly reversed.

It is to be noted that the pins 35 and 38 extend along the same axis and the pins 37 and 39 extend along the similar axis on the opposite side of the car. No locking means for preventing the tilting of the car has been shown, but any well known means may be provided if desired. Such means are not required, however, in a car of this type, which cannot dump without one side lifting while the other side remains stationary. It has, therefore, not the tendency to dump which is present in cars having a single center dumping pivot located below the center of gravity of the dumping mass.

I have shown one preferred form of construction by way of illustration, but it is to be understood that I contemplate such changes and modifications to meet varying conditions, as may come within the spirit and scope of the appended claims.

I claim:

1. In a dump car, a center girder construction, a car body, a cross member fixed to the bottom of the car body, and a pair of transverse members, one upon each side of the cross member, said transverse members being hinged at one end to the center girder construction and at the other to the cross member.

2. In a dump car, a center girder construction, a car body, and a plurality of tilting constructions each comprising a cross member fixed to the bottom of the car body, and a pair of transverse members, one upon each side of the cross member, said transverse members being hinged at one end to the center girder construction and at the other to the cross member, certain of the transverse members being hinged to one side of the center girder construction, and others to the opposite side of the center girder construction.

3. In a dump car, a center girder construction, a car body, a plurality of tilting constructions each comprising a cross member fixed to the bottom of the car body, and a pair of transverse members, one upon each side of the cross member, said transverse members being hinged at one end to the center girder construction and at the other to the cross member, certain of the transverse members being hinged to one side of the center girder construction and others to the opposite side of the center girder construction and all of the hinges on each side of the car being on a single axial line.

Signed at Duluth, Minnesota, this 6th day of February, 1926.

EDWARD A. MALMGREN.